United States Patent
Tsingauz et al.

(10) Patent No.: US 10,853,041 B2
(45) Date of Patent: Dec. 1, 2020

(54) EXTENSIBLE INSTRUMENTATION

(71) Applicant: MICROSOFT TECHNOLOGY LICENSING, LLC, Redmond, WA (US)

(72) Inventors: Aleksey Tsingauz, Renton, WA (US); John Lawrence Hamby, Port Townsend, WA (US); Manish Kumar Jayaswal, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 39 days.

(21) Appl. No.: 15/454,949

(22) Filed: Mar. 9, 2017

(65) Prior Publication Data

US 2018/0260197 A1    Sep. 13, 2018

(51) Int. Cl.
*G06F 9/44* (2018.01)
*G06F 8/41* (2018.01)

(52) U.S. Cl.
CPC ................... *G06F 8/443* (2013.01)

(58) Field of Classification Search
CPC ............. G06F 11/3466; G06F 11/3612; G06F 11/3636; G06F 2201/865; G06F 11/3476
See application file for complete search history.

(56) References Cited

U.S. PATENT DOCUMENTS

| | | | |
|---|---|---|---|
| 5,581,696 A | 12/1996 | Kolawa et al. | |
| 5,790,858 A | 8/1998 | Vogel | |
| 5,987,249 A | 11/1999 | Grossman et al. | |
| 6,085,029 A * | 7/2000 | Kolawa | G06F 11/3624 714/38.13 |
| 6,434,741 B1 | 8/2002 | Mirani et al. | |
| 6,662,362 B1 | 12/2003 | Arora et al. | |
| 7,047,521 B2 | 5/2006 | Bunnell | |
| 7,805,717 B1 * | 9/2010 | Spertus | G06F 8/48 717/130 |
| 8,756,584 B2 * | 6/2014 | Zhou | G06F 11/3636 717/124 |
| 9,836,379 B2 * | 12/2017 | Badea | G06F 11/3644 |
| 2002/0016918 A1 | 2/2002 | Tucker et al. | |
| 2004/0015953 A1 | 1/2004 | Vincent | |
| 2005/0039187 A1 * | 2/2005 | Avakian | G06F 11/3476 719/310 |
| 2005/0251790 A1 * | 11/2005 | Hundt | G06F 11/3466 717/130 |
| 2006/0048114 A1 | 3/2006 | Schmidt | |

(Continued)

OTHER PUBLICATIONS

U.S. Appl. No. 15/454,912, Matousek, et al., "Mapping Dynamic Analysis Data to Source Code", filed Mar. 9, 2017.

(Continued)

*Primary Examiner* — Duy Khuong T Nguyen
(74) *Attorney, Agent, or Firm* — Rainier Patents, P.S.

(57) ABSTRACT

Instrumentation is extensible because the language construct to be instrumented and the particular instrumentation desired for the language construct can be provided to the compiler for each individual compilation using input provided during compilation of a program using a dynamic analyzer. The dynamic analyzer can identify the programming language construct to be instrumented and the instrumentation to be inserted into the code. The dynamic analyzer can analyze the data that is collected.

20 Claims, 7 Drawing Sheets

(56) References Cited

U.S. PATENT DOCUMENTS

| | | | |
|---|---|---|---|
| 2007/0180439 A1 | 8/2007 | Sundararajan et al. | |
| 2007/0234299 A1* | 10/2007 | Watanabe | G06F 11/3476 717/124 |
| 2009/0024986 A1 | 1/2009 | Meijer et al. | |
| 2009/0178031 A1 | 7/2009 | Zhao | |
| 2010/0037101 A1 | 2/2010 | Zakonov et al. | |
| 2010/0077388 A1* | 3/2010 | Kimura | G06F 11/3466 717/158 |
| 2012/0079460 A1 | 3/2012 | Cho et al. | |
| 2012/0246627 A1 | 9/2012 | Partridge et al. | |
| 2012/0265824 A1 | 10/2012 | Lawbaugh | |
| 2015/0309813 A1* | 10/2015 | Patel | G06F 8/75 703/22 |
| 2016/0259636 A1 | 9/2016 | Plate et al. | |
| 2016/0357655 A1* | 12/2016 | Mukai | G06F 11/3409 |
| 2017/0090874 A1 | 3/2017 | Blumenau | |
| 2018/0032320 A1* | 2/2018 | Aldea Lopez | G06F 8/34 |

OTHER PUBLICATIONS

U.S. Appl. No. 15/454,990, Hamby, et al., "Instrumenting Program Code", filed Mar. 9, 2017.
David, "Incompatibility with Cudafy.Net", http://forum.ncrunch.net/yaf_postsm5944_Incompatibility-with-Cudafy-Net.aspx, Retrieved on: Jan. 11, 2017, 2 pages.
"Instrumenting and Compiling the Source Code", https://www.ibm.com/support/knowledgecenter/en/SSSHUF_8.0.0/com.ibm.rational.testrt.studio.doc/topics/tclicompile.htm, Retrieved on: Jan. 11, 2017, 2 pages.
Baxter, Ira. D., "Branch Coverage for Arbitrary Languages Made Easy: Transformation Systems to the Rescue!", http://www.semdesigns.com/Company/Publications/TestCoverage.pdf, Published on: Jan. 23, 2002, 6 pages.
"Ada code instrumentation as GNAT compilation part?", https://web.archive.org/web/20141005202153/http:/stackoverflow.com/questions/22111437/ada-code-instrumentation-as-gnat-compilation-part, Published on: Oct. 5, 2014, 2 pages.
"Adding source instrumentation code—Is source-to-source compiler right approach? How to build one?", https://web.archive.org/web/20140922144558/http:/stackoverflow.com/questions/12969420/adding-source-instrumentation-code-is-source-to-source-compiler-right-approach, Published on: Sep. 22, 2014, 2 pages.
Luk, et al., "Pin: Building Customized Program Analysis Tools with Dynamic Instrumentation", In Proceedings of ACM Sigplan Notices, vol. 40, No. 6, Jun. 12, 2005, 11 pages.
"Dynamic code analysis", http://www.viva64.com/en/t/0070/, Published on: Jan. 31, 2013, 5 pages.
Brais, Hadi, "Application Instrumentation: Application Analysis with Pin", https://msdn.microsoft.com/en-us/magazine/dn818497.aspx, Published on: Nov. 2014, 16 pages.
Allen, et al., "Computational Science—ICCS 2009: 9th International Conference Baton Rouge", In Proceedings of 9th International Conference Baton Rouge, May 25, 2009, 2 pages.
Larus, et al., "Rewriting executable files to measure program behavior", In Journal of Software: Practice and Experience, vol. 24, Issue 2, Feb. 1994, pp. 197-218.
"Profiling (computer programming)", https://en.wikipedia.org/wiki/Profiling_(computer_programming), Retrieved on: Feb. 27, 2017, 6 pages.
Srivastava, et al., "ATOM: A System for Building Customized Program Analysis Tools", In WRL Research Report 94/2, Mar. 1994, 27 pages.
"Non Final Office Action Issued in U.S. Appl. No. 15/454,990", dated Apr. 5, 2018, 31 pages.
"Non Final Office Action Issued in U.S. Appl. No. 15/454,912", dated Apr. 5, 2018, 27 Pages.
"Final Office Action Issued in U.S. Appl. No. 15/454,990", dated Sep. 20, 2018, 24 Pages.
"Non-Final Office Action Issued in U.S. Appl. No. 15/454,990", dated Jan. 9, 2020, 26 Pages.

* cited by examiner

```
1 PROGRAM MAIN
  2 METHOD 1
168c  3 DO WHILE p         ⎫
      4 STATEMENT           ⎬ 168a
      5 END WHILE          ⎭
  6 END METHOD 1            ⎫
                            ⎬ 168
  7 METHOD 2                ⎫
  8 STATEMENT               ⎬ 168b
  9 STATEMENT               ⎪
  10 STATEMENT              ⎪
  11 END METHOD 2          ⎭
```

ORIGINAL (UNINSTRUMENTED) CODE

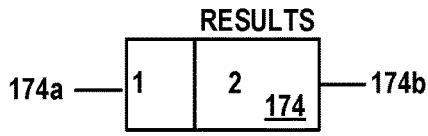

ANALYSIS TABLE FOR METHOD 1

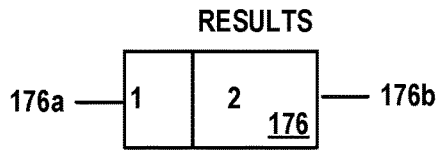

ANALYSIS TABLE FOR METHOD 2

```
1 PROGRAM MAIN
2 METHOD 1
170a  3 GET ANALYSIS TABLE FOR METHOD 1
4 DO WHILE p
    5 ADD 1 TO WHILE COUNTER
    6 WRITE THE COUNTER TO METHOD 1
ANALYSIS TABLE, INDEX = INSTRUMENTATION
POINT.                                    170c
    7 STATEMENT
8 END WHILE
9 END METHOD 1

10 METHOD 2
170b 11 GET ANALYSIS TABLE FOR METHOD 2
    12 ADD 1 TO METHOD 2 COUNTER OR THIS
COULD BE INSTEAD CALL COUNTER PROGRAM
WHERE COUNTER PROGRAM ADDS 1 TO A
METHOD EXECUTION COUNTER
    13 WRITE THE COUNTER TO METHOD 2
ANALYSIS TABLE, INDEX = INSTRUMENTATION
POINT.                                    170d
14 STATEMENT
15 STATEMENT
16 STATEMENT
17 END METHOD 2                           170
```

INSTRUMENTED PSEUDO CODE

```
1  BEGIN METHOD
2  IF IR NODE REPRESENTS THE BODY OF THE LOOP IN METHOD1
3     RESERVE A DEDICATED SLOT TO STORE A VALUE OF TYPE INTEGER IN DYNAMIC
ANALYSIS STORE
4     ADD AN IR NODE REPRESENTING AN INCREMENT OF THE CURRENT VALUE IN THE SLOT
AT THE BEGINNING OF THE LOOP BODY
5     RETURN
6  END IF
7  IF IR NODE REPRESENTS THE BODY OF THE METHOD2
8     RESERVE A DEDICATED SLOT TO STORE A VALUE OF TYPE INTEGER IN DYNAMIC
ANALYSIS STORE
9     ADD AN IR NODE REPRESENTING AN INCREMENT OF THE CURRENT VALUE IN THE SLOT
AT THE BEGINNING OF THE METHOD BODY
10    RETURN
11 END IF                                                              172
12 END METHOD
```

FIG. 1b

```
public class DynamicAnalyzer
{
   public abstract void Initialize(DynamicAnalysisContext context);
   public void RegisterStatementAction<T>(Action<ref T> collect, Func<T, T, T> aggregate) {}
   // Various other Register* methods...
}
```
160

```
class StatementCoverageAnalyzer : DynamicAnalyzer
{
   public override void Initialize(DynamicAnalysisContext context)
   {
      context.RegisterStatementAction<bool>(
         (ref payload) =>
         {
            payload = true;
         },
         (payload1, payload2) => payload1 || payload2;
   }
}
```
162

FIG. 1c

```
class StatementCoverageAnalyzer : DynamicAnalyzer
{
    public override void Initialize(DynamicAnalysisContext context)
    {
        context.RegisterStatementAction<long>(
            (ref payload) =>
            {
                while (true)
                {
                    long oldPayload = payload;
                    if (Interlocked.CompareExchange(ref payload, oldPayload + 1, oldPayload) == oldPayload)
                    {
                        return;
                    }
                }
            },
            (payload1, payload2) => payload1 + payload2;
    }
}
```
164

FIG. 1c cont.

EXTENSIBLE INSTRUMENTATION

CROSS-REFERENCE TO RELATED APPLICATIONS

The application is related in subject matter to co-pending U.S. patent application Ser. No. 15/454,990 entitled "INSTRUMENTING PROGRAM CODE", filed on Mar. 9, 2017. The application is related in subject matter to co-pending U.S. patent application Ser. No. 15/454,912 entitled "MAPPING DYNAMIC ANALYSIS DATA TO SOURCE CODE", filed on Mar. 9, 2017.

BACKGROUND

Instrumentation is a technique in which instructions are added to a program to collect information when the program runs. Typically, the information collected relates to performance or other behavioral characteristics of the program. A program can be instrumented manually (meaning that the instructions are added, usually to the source code, by a person). A program can be instrumented automatically, by another program (e.g., by a compiler, etc.). Instrumentation can be added to the source code, to byte code or to a compiled binary. Code can be instrumented as the source code is developed. Code can be instrumented right before execution (runtime instrumentation).

SUMMARY

Compilation can be augmented to support dynamic analysis using information that is provided to the compiler during compilation. Dynamic analysis reveals information about a program's behavior using data collected while the program is running A compiler can instrument the program code during compilation to collect dynamic analysis data when the program is executed. The compiler can inject the instrumentation code at particular points in the code based on specified programming language constructs in the source program. The types of instrumentation injected can be extensible because the instrumentation information is provided at compile time rather than being hard coded into the compiler.

Instrumentation is extensible because the programming language construct to be instrumented and the particular instrumentation desired for the programming language construct can be provided to the compiler for each individual compilation using input provided by a dynamic analyzer. The dynamic analyzer can identify the programming language construct to be instrumented and the instrumentation to be inserted into the code. The dynamic analyzer can analyze the data that is collected.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF DRAWINGS

FIG. 1b is a block diagram illustrating an example of pseudo code 168 for an original un-instrumented program, pseudo code 170 for the instrumented program, corresponding pseudo code 172 for a dynamic analyzer, an analysis table 174 and an analysis table 176 in accordance with aspects of the subject matter disclosed herein;

FIG. 1c is a block diagram illustrating an example of code 160 that defines a base type for a dynamic analyzer, an example of code 162 that captures if each statement is executed and an example of code 164 that counts how many times each statement is executed in accordance with aspects of the subject matter disclosed herein;

DETAILED DESCRIPTION

Overview

Figure 1A:
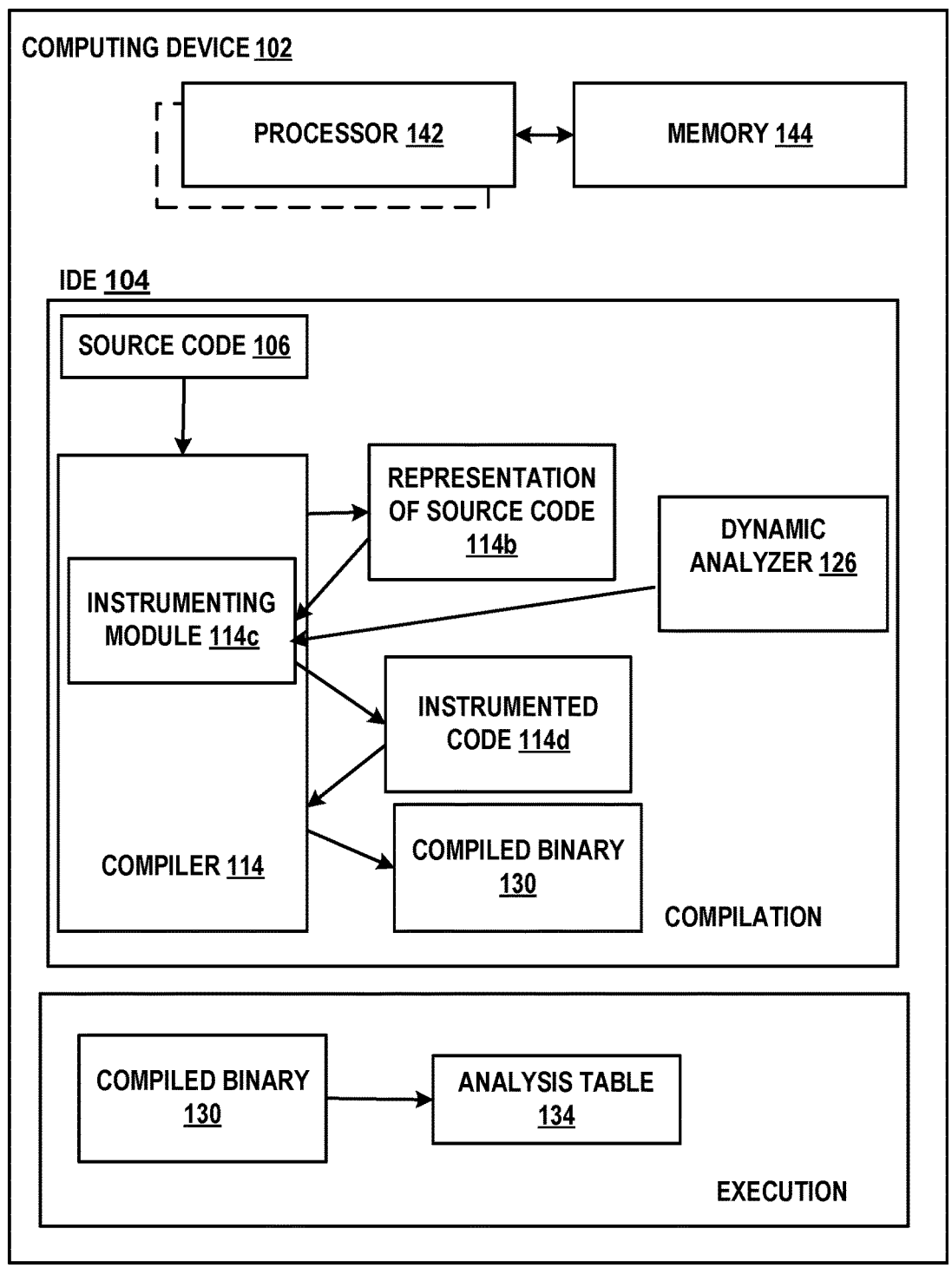
FIG. 1a is a block diagram illustrating an example of a system 100 for instrumenting program code for dynamic analysis in accordance with aspects of the subject matter disclosed herein.

One known approach to instrumentation rewrites program source code to add instrumentation before compilation. This approach is limited by definition to transformations that are practical at the source code level and so, for example, is constrained by the expressiveness of the programming language.

Another known approach injects instrumentation into programs after compilation. With this approach it is difficult to maintain accurate correspondence between the information collected and program source code in the presence of language constructs that undergo significant transformation during compilation.

All known approaches to automated instrumentation provide only a fixed set of predefined instrumentations. That is, for example, in known compilers, the set of instrumentations that can be made by the compiler are hard-coded into the compiler. New instrumentations cannot be added without reprogramming the compiler. In contrast, in accordance with aspects of the subject matter disclosed herein, instrumentation is performed while the program is being compiled based on information provided to the compiler for each compilation. Thus, the set of programming language constructs that are eligible for instrumentation are extensible, that is, can be added to by providing the new programming language construct to the compiler at compile time. The instrumentation that is performed for a programming language construct can be added to, changed or newly supplied by providing this information to the compiler at compile time. Programming language constructs can be identified that correspond to particular parts of program structure including but not limited to: a statement, invocation, basic block, expression, method, subroutine, global function, class constructor, operator or any sequence of instructions as identified by the instrumentation information provided to the compiler at compile time.

The subject matter disclosed herein addresses the instrumentation of computer programs to collect data that can be used to determine dynamic characteristics of a program. Dynamic characteristics are characteristics of runtime behavior. Examples include but are not limited to: which statements of a program execute, how many times does a particular statement executes, how many times does a particular method execute, what is the set of actual receiver types for each virtual method call in a program, what is the size of an array allocated for an array creation expression, what is the maximum call stack depth at each method call site, what is the set of actual types encountered at each cast, are there patterns in traces of execution paths (e.g., does the path taken in one if statement correlate with the path taken in another if statement) and so on. The information that is collected does not have to be predefined but is extensible as described more fully below.

In accordance with some aspects of the subject matter disclosed herein, the instrumentation performed can be controlled and defined. In accordance with some aspects of the subject matter disclosed herein, controlling and defining the instrumentations to be performed during runtime can be implemented through a dynamic analyzer. Some implementations of the subject matter as disclosed herein can include collecting any type of dynamic analysis information by providing a dynamic analyzer that defines characteristics of the information to be collected. For example, the dynamic analyzer can: specify the points in the code where instrumentation collects information, identify code constructs to be instrumented, define the instrumentation to collect data, define a mechanism to aggregate collected data and/or define the publishing of aggregated data. Because the types of instrumentations possible are not limited to instrumentations that are predefined in the compiler, the instrumentations possible during compilation are extensible (can be added to) without reprogramming the compiler.

An implementation of an application programming interface or API (i.e., a dynamic analyzer) can be supplied to the compiler so that the compiler can inject calls such as but not limited to calls to the dynamic analyzer into rewritten code. The rewritten code can be IR (Intermediate Representation). The rewritten code can be lowered (in lowered code, higher level programming language constructs are rewritten as lower level constructs). The dynamic analyzer can include or identify the construct to be instrumented. The dynamic analyzer can include or identify the instrumentation code to be added to rewritten code. The dynamic analyzer can be supplied to the compiler as an assembly or as another type of compiled binary or executable. The instrumentation code that is inserted into the rewritten code, when executed, can collect the information that can be analyzed. Constructs eligible for instrumentation can be statically determined for a predefined analysis. That is, the compiler can be programmed to determine at least some instrumentation-eligible constructs so that a dynamic analyzer is not needed for the predefined analysis. On the other hand, constructs eligible for instrumentation can be programmatically specified by a dynamic analyzer. In either case, the compiler can recognize an instrumentation-eligible construct as it is encountered during compilation. When an instrumentation-eligible programming language construct is recognized as the code is being processed, the compiler can insert code into the program to perform the specified instrumentation for the instrumentation-eligible programming language construct.

The code that is inserted to perform the instrumentation can be implemented by inserting code that will call an instrumentation method or other code when the relevant portion of code is executed. The dynamic analyzer can specify a method or other program construct to call and/or to execute the instrumentation. A call to the method or other program construct can be inserted into the code by the compiler so that when the instrumented program is executed, the method or other program construct is executed. In accordance with some aspects of the subject matter disclosed herein, recognition of instrumentation-eligible constructs and insertion of the code to perform the instrumentation can occur during a local rewriting phase when the code is still very similar to the source code. For example, suppose the desired dynamic analysis comprises determining which executable statements in a program actually execute. In this case, instrumentation code can be inserted for every executable statement of the source code.

Extensible Instrumentation

A compiler is a computer program (or a set of programs sometimes referred to as a compiler chain) that converts source code written in a programming language into a compiled binary. A compiled binary is code that can be executed by a computer.

Compilers often are described as having a front end, a middle end and a back end. The front end includes lexical analysis, syntax analysis, and semantic analysis. The output of the front end is an intermediate representation (IR) of the source code for processing by the middle end. IR is the data structure or code used internally by a compiler or virtual machine to represent source code. A good IR is conducive to optimization and translation.

Compilers typically operate in multiple phases. For example, passes for the front end may include a lexical analysis phase which converts the source code text into tokens, which are atomic units of the programming language. Examples of tokens include identifiers, keywords, numeric literals and operators.

During the syntax analysis phase, the token sequence is parsed to create a parse tree or syntax tree adhering to the rules of a formal grammar defining the syntax of the language. The parse tree is often analyzed, augmented, and transformed by later phases in the compiler.

In the semantic analysis pass(es) the compiler creates new trees including semantic information or adds semantic information to the parse tree and builds the symbol table. Semantic analysis can include type checking, object binding (associating variable and function references with their definitions to the syntax tree), checking that all local variables are initialized before use and so on. Warnings and error messages are typically produced during semantic analysis. Semantic analysis typically follows the parsing phase, and precedes the code generation phase.

The middle end typically performs optimizations on a form other than the source code or machine code (e.g., on IR). The middle end performs optimizations such as removal of useless or unreachable code and can move code around to make execution more efficient. The middle end may generate another form of code for input to the back end.

The back end takes the output from the middle end. The back end may perform additional analysis and optimizations designed for a particular computer architecture. The back end can generate target-dependent code.

FIG. 1a is a block diagram illustrating an example of an extensible system 100 for instrumenting program code to collect information for dynamic analysis using information provided to the compiler at compile time, in accordance with aspects of the subject matter disclosed herein. All or portions of system 100 may reside on one or more computers or computing devices such as the computers described below with respect to FIG. 3. System 100 may execute wholly or partially within an IDE such as IDE 104 or can execute wholly or partially outside an IDE. An IDE can be an IDE such as the one described with respect to FIG. 4 or can be any other IDE. All or portions of system 100 may be implemented as a plug-in or add-on.

System 100 or portions thereof may include information obtained from a service (e.g., in the cloud) or may operate in a cloud computing environment. A cloud computing environment can be an environment in which computing services are not owned but are provided on demand. For example, information may reside on multiple devices in a networked cloud and/or data can be stored on multiple devices within the cloud. System 100 can be an on-premises system.

System 100 can include one or more computing devices. Contemplated computing devices include but are not limited to desktop computers, tablet computers, laptop computers, notebook computers, personal digital assistants, smart phones, cellular telephones, mobile telephones, sensors, server computers, client computers and so on. A computing device such as computing device 102 can include one or more processors such as processor 142, etc., and a memory such as memory 144 that communicates with the one or more processors.

System 100 may include one or more program modules that when loaded into the memory and accessed by the one or more processors cause the processor to perform the action or actions attributed to the one or more program modules. The processor(s) may be configured to perform the action or actions attributed to the one or more program modules. System 100 may include any one of or any portion of any combination of any number of the following: a compiler or portion of a compiler such as compiler 114. Compiler 114 may be comprised of a front end portion, a middle end portion and/or a back end portion. Compiler 114 can include program modules including but not limited to: a parsing module, a semantic analyzing module, an instrumenting module and/or a rewriter which can rewrite higher level programming language constructs into lower level constructs.

Compiler 114 can receive source code such as source code 106. Source code in any programming language can be received. The parser may create a parse tree or syntax tree from the source code 106. The semantic analyzer may receive the syntax tree and create a bound tree. The semantic analyzer may create a symbol table.

An instrumenting module such as instrumenting module 114c can receive information from a dynamic analyzer such as dynamic analyzer 126. The dynamic analyzer 126 can include code that implements an API. The dynamic analyzer can specify the constructs in the source code that are to be instrumented. For example, the dynamic analyzer can specify that whenever a "for loop" programming language construct is encountered, specified information is to be collected. The dynamic analyzer can specify the instrumentation to be inserted into the code. The dynamic analyzer can specify a call to a method or other code construct to be inserted into the code. The dynamic analyzer can define the publishing of aggregated data, and so on. The instrumenting module 114c can receive a representation of the source code 106 produced by the compiler such as representation 114b and, based on information provided by the dynamic analyzer 126 can generate instrumented program code such as instrumented program code 114d. Instrumented program code 114d can be processed by the rest of the compiler to result in compiled binary 130. When the compiled binary is executed, dynamic analysis information can be captured in analysis table 134.

FIG. 1b code block 168 illustrates an example of pseudo code for an original un-instrumented program that includes two methods, Method 1 168a and Method 2 168b. FIG. 1b code block 170 illustrates the corresponding instrumented pseudo code. In accordance with some aspects of the subject matter disclosed herein, at the beginning of each instrumented method, code is inserted that makes a call to access a table (e.g., an array) in which to store the analysis data (e.g., pseudo code line 3 170a and pseudo code line 11 170b of instrumented pseudo code block 170). FIG. 1b code block 172 represents corresponding pseudo code for a dynamic analyzer that specifies the instrumentation to be performed to the program.

Suppose a first dynamic analyzer instruments code to count how many times the DO WHILE loop 168c of Method 1 168a (original un-instrumented pseudo code lines 3-5) executes and a second dynamic analyzer instruments code to count how many times Method 2 168b executes (original un-instrumented pseudo code lines 7-11). The instrumentation can be added to the code where indicated by the data analyzer. For example, In FIG. 1b for the first data analyzer, instrumentation code has been added after the DO WHILE statement on line 3 in the original un-instrumented pseudo code program of code block 168. The instrumentation appears in the instrumented pseudo code on lines 5-6, instrumentation 170c. For the second dynamic analyzer instrumentation code has been added after line 7 (Method 2 168b) of the original pseudo code program 168. The instrumentation appears in the instrumented pseudo code on lines 12-13, instrumentation 170d.

When the program runs, the inserted call can be executed to see if the method already has an instrumentation table allocated. If such a table exists, it can be returned. Otherwise a table can be allocated and returned. The inserted instrumentation code can be executed and the results can be stored in the analysis table. For example, the first time the while loop is executed, the initialized value of the table (0) is returned, is incremented by one and the incremented value (1) (174a) is stored in the analysis table. The next time the while loop is executed, the current value of the table (1) is returned, is incremented by one and the incremented value (2) (174b) is stored in the analysis table and so on. Similarly, the first time method 2 is executed, the initialized value of the table (0) is returned, is incremented by one and the incremented value (1) is stored in the analysis table for Method 2 (176a). The next time method 2 is executed, the current value of the table (1) is returned, is incremented by one and the incremented value (2) is stored in the analysis table for Method 2 (176b) and so on.

At the end of the execution of the program MAIN, the results column of the analysis table for Method 1 174 will show the number of times the While loop was executed. At the end of the execution of the program MAIN the results column of the analysis table for Method 2 176 will show the number of times Method 2 was executed.

Code block 172 is an example of a dynamic analyzer corresponding to the instrumented pseudo code of code block 170. Line 4 of code block 172 implements instrumentation for counting of how many times the while loop is executed. Line 9 of code block 172 implements instrumentation for counting of how many times Method 2 is executed.

In FIG. 1c code block 160 illustrates an example of code that defines a base type that can encode the specification of the points in the code where instrumentation collects information, can identify code constructs to be instrumented, and can define the instrumentation to collect data. A compiler as disclosed herein can implicitly compile in calls to information collection actions at appropriate points in a program. For example, a reference to the data associated with the particular collection point can be supplied. A results aggregator can call an aggregation function to combine results from multiple test runs.

FIG. 1c code block 162 is an example of a dynamic analyzer that collects simple code coverage (collects information about whether or not each statement is executed). FIG. 1c code block 164 is an example of a dynamic analyzer that collects the number of times each statement executes (maintaining an accurate count even in the face of parallelism).

Figure 2:
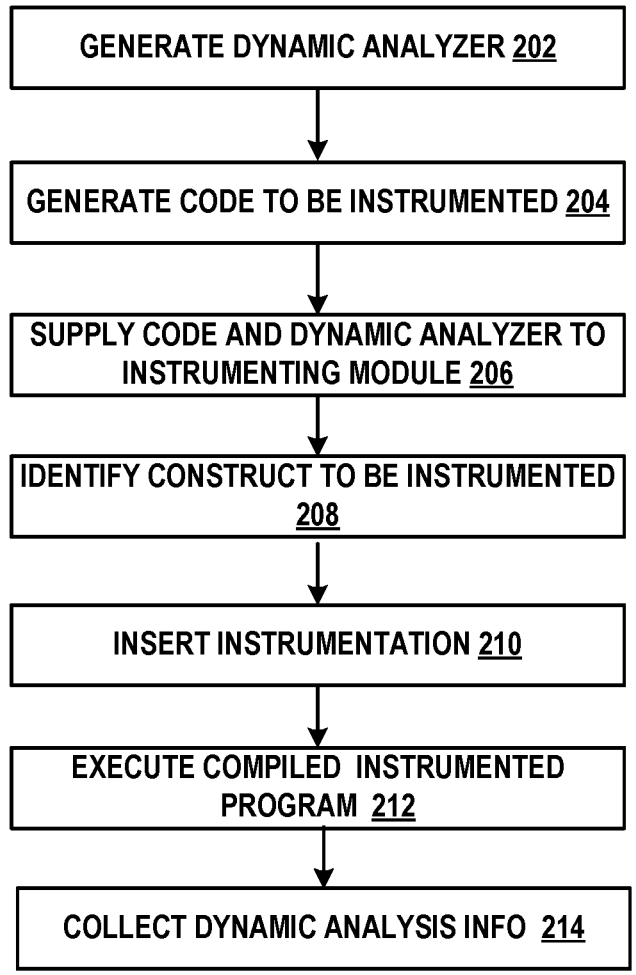
FIG. 2 is a flow diagram 200 of an example of a method 200 for instrumenting program code in accordance with aspects of the subject matter disclosed herein.

FIG. 2 is a flow diagram of an example of a method for instrumenting program code in accordance with aspects of the subject matter disclosed herein. The method described in FIG. 2 can be practiced by a system such as but not limited to the one described with respect to FIG. 1a. While method 200 describes a series of operations that are performed in a sequence, it is to be understood that method 200 is not limited by the order of the sequence depicted. For instance, some operations may occur in a different order than that described. In addition, one operation may occur concurrently with another operation. In some instances, not all operations described are performed. In some instances, not all operations performed are illustrated.

At operation 202 a dynamic analyzer can be generated. The dynamic analyzer can, for example, include code that can be called under particular circumstances during the compilation of a second program. The dynamic analyzer can identify a programming language construct to instrument (e.g., While loop, for loop, method, a particular part of a program structure including but not limited to: statements, invocations, basic blocks, expressions, etc.). The dynamic analyzer can provide or identify instrumentation instructions and may provide code that can be inserted into the program representation. At operation 204 code or a data structure representing a program that is to be instrumented can be generated. At operation 206 the code or data structure representing the program that is to be instrumented can be received by an instrumenting program module. The dynamic analyzer can be received by the instrumenting program module. At operation 208 the programming language construct to be instrumented can be identified. At operation 210 the code that performs the instrumentation can be inserted into the program. Alternatively or in addition, a call to code that performs the instrumentation can be inserted into the code. At operation 212 the compiled binary for the instrumented program can be generated and executed. At operation 214 dynamic analysis information can be collected while the program is being run, as described in detail above.

Described herein are an extensible instrumentation system comprising an instrumenting program module of a compiler. The compiler can be configured to receive a representation of a program for compilation, the representation of the program comprising a programming language construct. The compiler can be configured to receive a dynamic analyzer, the dynamic analyzer identifying a programming language construct in the representation of the program code and identifying instrumentation code to be inserted into the representation of the program for the programming language construct. The instrumenting program module of the compiler can insert the instrumentation code into the representation of the program. The dynamic analyzer can be one of an extensible set of dynamic analyzers. The dynamic analyzer can be provided to the instrumenting programming module at compilation of the program. The dynamic analyzer can provide instrumentation to insert into the representation of the program for the programming language construct. The instrumentation can comprise a call to a programming language construct. The programming language construct can access a table for storing dynamic analysis information.

Described herein is a method comprising providing a program to be instrumented and a dynamic analyzer to a processor configured to instrument a program. The dynamic analyzer can identify a programming language construct in the program and instrumentation code to be inserted into a representation of the program. The instrumentation code can be inserted into the representation of the program. A dynamic analyzer can implement an API. The dynamic analyzer can identify a method, a call to which is inserted into the representation of the program. The method can access a table for storing dynamic analysis information. Dynamic analysis information can be collected when the program is run. An additional dynamic analyzer can be provided to the processor, thereby extending a set of instrumentations to be performed without reprogramming the instrumenting program module, the instrumenting program module comprising a compiler.

Described herein is a device having a memory, a processor connected to the memory, the processor configured to receive by a compiler extensible instrumentation instructions for a programming language construct of a program and insert the extensible instrumentation instructions into a representation of the program, the instructions collecting dynamic analysis information upon execution of a compiled binary generated from the program. The extensible instrumentation instructions can be provided by one of a plurality of dynamic analyzers. The extensible instrumentation instructions can identify a programming language construct to instrument. The extensible instrumentation instructions can identify the instrumentation code to insert into the representation of the program. The instructions inserted into the representation of the source code can comprise a call to a programming language construct. Instrumentations performed on a programming language construct can be extensible without reprogramming the compiler. The set of dynamic analyzers can be extensible. The set of dynamic analyzers can be extended by generating an additional dynamic analyzer.

Exemplary Operating Environment

Figure 3:
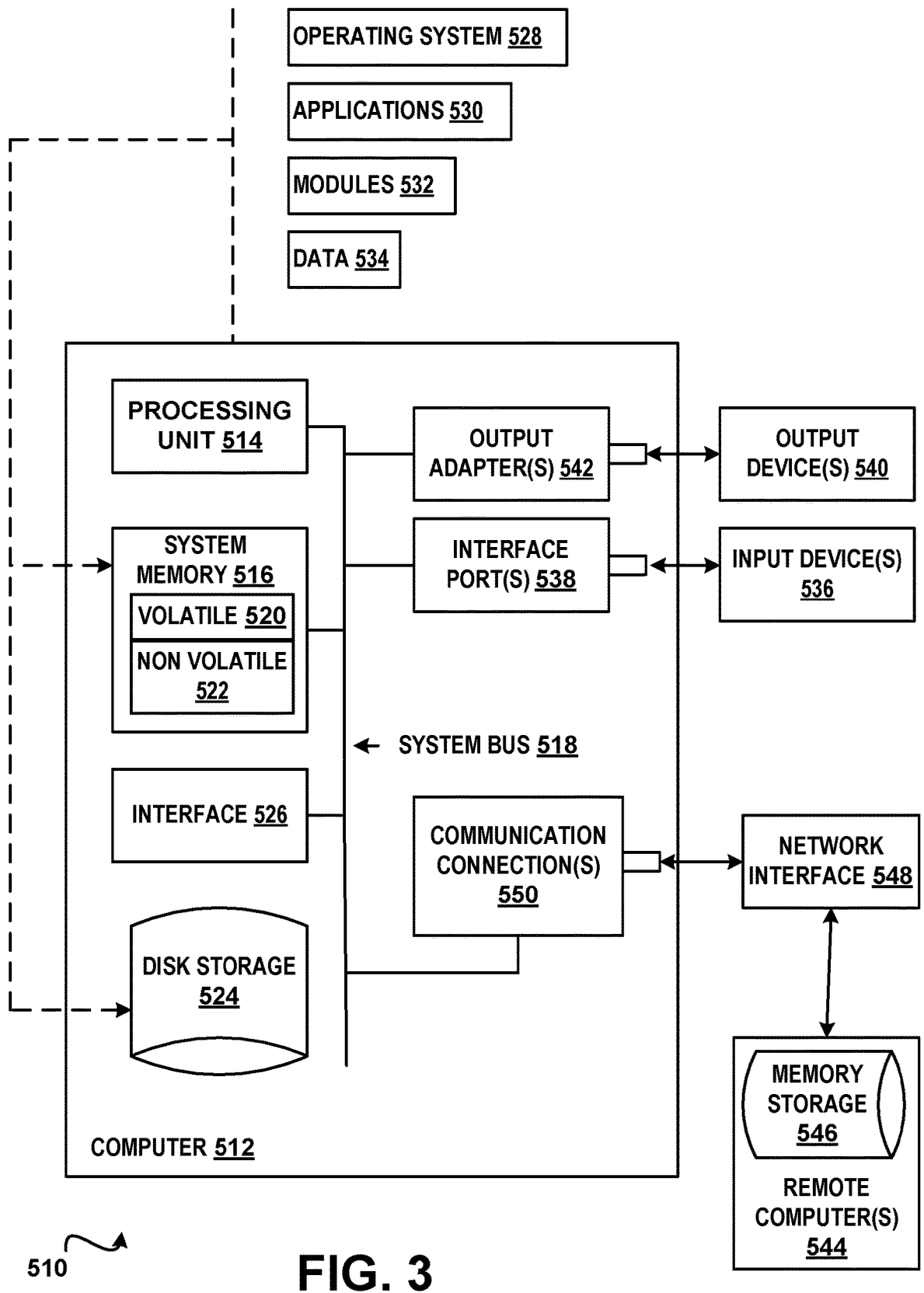
FIG. 3 is a block diagram of an example of a computing environment in accordance with aspects of the subject matter described herein.

In order to provide context for various aspects of the subject matter disclosed herein, FIG. 3 and the following discussion are intended to provide a brief general description of a suitable computing environment 510 in which various embodiments of the subject matter disclosed herein may be implemented. While the subject matter disclosed herein is described in the general context of computer-executable instructions, such as program modules, executed by one or more computers or other computing devices, those skilled in the art will recognize that portions of the subject matter disclosed herein can also be implemented in combination with other program modules and/or a combination of hardware and software. Generally, program modules include routines, programs, objects, physical artifacts, data structures, etc. that perform particular tasks or implement particular data types. Typically, the functionality of the program modules may be combined or distributed as desired in various embodiments. The computing environment 510 is only one example of a suitable operating environment and is not intended to limit the scope of use or functionality of the subject matter disclosed herein.

With reference to FIG. 3, a computing device in the form of a computer 512 is described. Computer 512 may include at least one processing unit 514, a system memory 516, and a system bus 518. The at least one processing unit 514 can execute instructions that are stored in a memory such as but not limited to system memory 516. The processing unit 514 can be any of various available processors. For example, the processing unit 514 can be a graphics processing unit (GPU). The instructions can be instructions for implementing functionality carried out by one or more components or modules discussed above or instructions for implementing one or more of the methods described above.

Dual microprocessors and other multiprocessor architectures also can be employed as the processing unit 514. The computer 512 may be used in a system that supports rendering graphics on a display screen. In another example, at least a portion of the computing device can be used in a system that comprises a graphical processing unit. The system memory 516 may include volatile memory 520 and nonvolatile memory 522. Nonvolatile memory 522 can include read only memory (ROM), programmable ROM (PROM), electrically programmable ROM (EPROM) or flash memory. Volatile memory 520 may include random access memory (RAM) which may act as external cache memory. The system bus 518 couples system physical artifacts including the system memory 516 to the processing unit 514. The system bus 518 can be any of several types including a memory bus, memory controller, peripheral bus, external bus, or local bus and may use any variety of available bus architectures. Computer 512 may include a data store accessible by the processing unit 514 by way of the system bus 518. The data store may include executable instructions, 3D models, materials, textures and so on for graphics rendering.

Computer 512 typically includes a variety of computer readable media such as volatile and nonvolatile media, removable and non-removable media. Computer readable media may be implemented in any method or technology for storage of information such as computer readable instructions, data structures, program modules or other data. Computer readable media include computer-readable storage media (also referred to as computer storage media) and communications media. Computer storage media includes physical (tangible) media, such as but not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices that can store the desired data and which can be accessed by computer 512. Communications media include media such as, but not limited to, communications signals, modulated carrier waves or any other intangible media which can be used to communicate the desired information and which can be accessed by computer 512.

It will be appreciated that FIG. 3 describes software that can act as an intermediary between users and computer resources. This software may include an operating system 528 which can be stored on disk storage 524, and which can allocate resources of the computer 512. Disk storage 524 may be a hard disk drive connected to the system bus 518 through a non-removable memory interface such as interface 526. System applications 530 take advantage of the management of resources by operating system 528 through program modules 532 and program data 534 stored either in system memory 516 or on disk storage 524. It will be appreciated that computers can be implemented with various operating systems or combinations of operating systems.

A user can enter commands or information into the computer 512 through an input device(s) 536. Input devices 536 include but are not limited to a pointing device such as a mouse, trackball, stylus, touch pad, keyboard, microphone, voice recognition and gesture recognition systems and the like. These and other input devices connect to the processing unit 514 through the system bus 518 via interface port(s) 538. An interface port(s) 538 may represent a serial port, parallel port, universal serial bus (USB) and the like. Output devices(s) 540 may use the same type of ports as do the input devices. Output adapter 542 is provided to illustrate that there are some output devices 540 like monitors, speakers and printers that require particular adapters. Output adapters 542 include but are not limited to video and sound cards that provide a connection between the output device 540 and the system bus 518. Other devices and/or systems or devices such as remote computer(s) 544 may provide both input and output capabilities.

Computer 512 can operate in a networked environment using logical connections to one or more remote computers, such as a remote computer(s) 544. The remote computer 544 can be a personal computer, a server, a router, a network PC, a peer device or other common network node, and typically includes many or all of the elements described above relative to the computer 512, although only a memory storage device 546 has been illustrated in FIG. 3. Remote computer(s) 544 can be logically connected via communication connection(s) 550. Network interface 548 encompasses communication networks such as local area networks (LANs) and wide area networks (WANs) but may also include other networks. Communication connection(s) 550 refers to the hardware/software employed to connect the network interface 548 to the bus 518. Communication connection(s) 550 may be internal to or external to computer 512 and include internal and external technologies such as modems (telephone, cable, DSL and wireless) and ISDN adapters, Ethernet cards and so on.

It will be appreciated that the network connections shown are examples only and other means of establishing a communications link between the computers may be used. One of ordinary skill in the art can appreciate that a computer 512 or other client device can be deployed as part of a computer network. In this regard, the subject matter disclosed herein may pertain to any computer system having any number of memory or storage units, and any number of applications and processes occurring across any number of storage units or volumes. Aspects of the subject matter disclosed herein may apply to an environment with server computers and client computers deployed in a network environment, having remote or local storage. Aspects of the subject matter disclosed herein may also apply to a standalone computing device, having programming language functionality, interpretation and execution capabilities.

Figure 4:
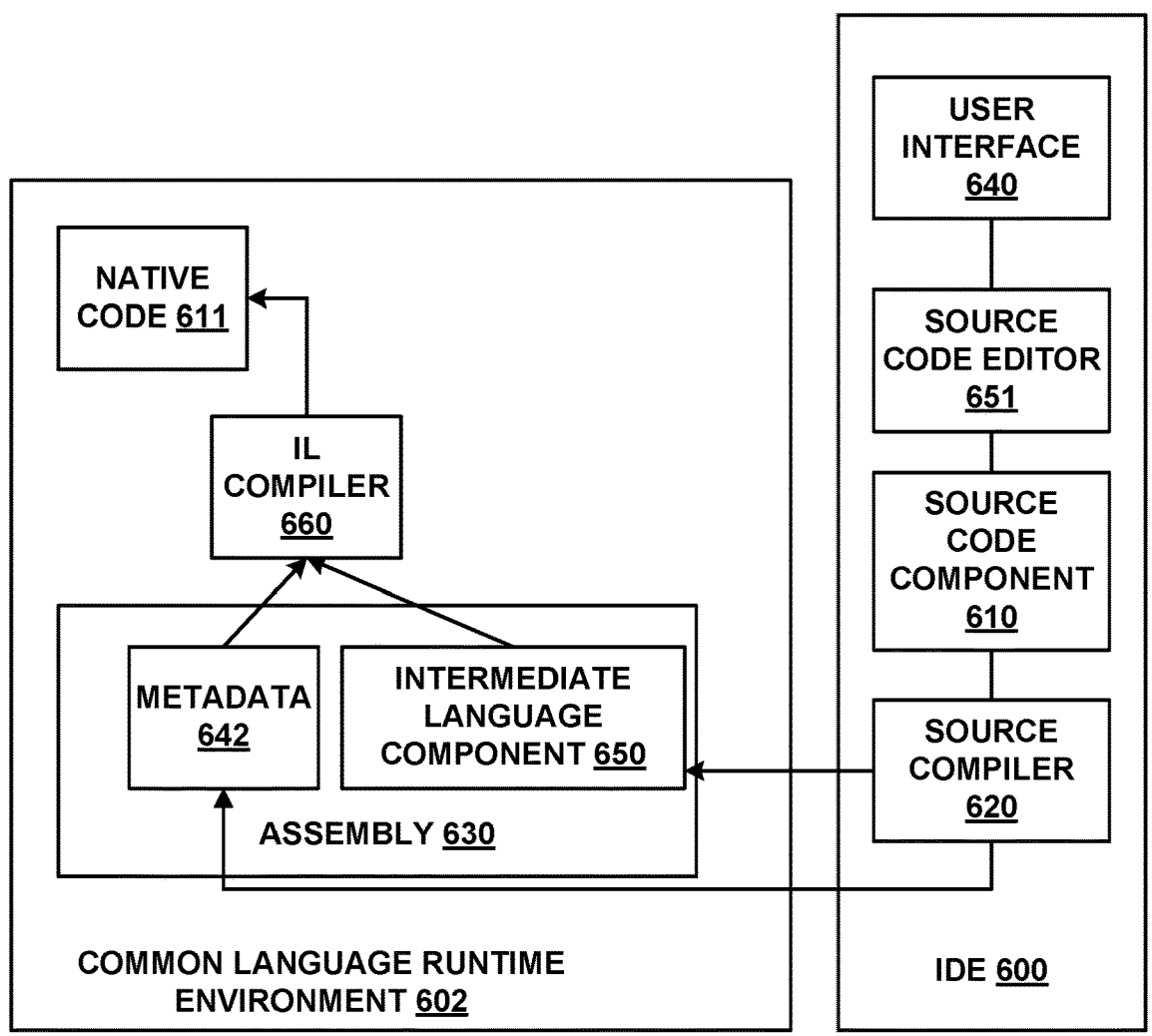
FIG. 4 is a block diagram of an example of an integrated development environment in accordance with aspects of the subject matter described herein.

FIG. 4 illustrates an integrated development environment (IDE) 600 and Common Language Runtime Environment 602. An IDE 600 may allow a user (e.g., developer, programmer, designer, coder, etc.) to design, code, compile, test, run, edit, debug or build a program, set of programs, web sites, web applications, and web services in a computer system. Software programs can include source code (component 610), created in one or more source code languages (e.g., Visual Basic, Visual J #, C++. C #, J #, Java Script, APL, COBOL, Pascal, Eiffel, Haskell, ML, Oberon, Perl, Python, Scheme, Smalltalk and the like). The IDE 600 may provide a native code development environment or may provide a managed code development that runs on a virtual machine or may provide a combination thereof. The IDE 600 may provide a managed code development environment using the .NET framework. An intermediate language component 650 may be created from the source code component 610 using a language specific source compiler 620 and the native code component 611 (e.g., machine executable instructions) is created from the intermediate language component 650 using the intermediate language compiler 660

(e.g. just-in-time (JIT) compiler), when the application is executed. That is, when an IL application is executed, it is compiled while being executed into the appropriate machine language for the platform it is being executed on, thereby making code portable across several platforms. Alternatively, in other embodiments, programs may be compiled to native code machine language (not shown) appropriate for its intended platform.

A user can create and/or edit the source code component according to known software programming techniques and the specific logical and syntactical rules associated with a particular source language via a user interface 640 and a source code editor 651 in the IDE 600. Thereafter, the source code component 610 can be compiled via a source compiler 620, whereby an intermediate language representation of the program may be created, such as assembly 630. The assembly 630 may comprise the intermediate language component 650 and metadata 642. Application designs may be able to be validated before deployment.

The various techniques described herein may be implemented in connection with hardware or software or, where appropriate, with a combination of both. Thus, the methods and apparatus described herein, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing aspects of the subject matter disclosed herein. As used herein, the term "machine-readable medium" shall be taken to exclude any mechanism that provides (i.e., stores and/or transmits) any form of propagated signals. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects, e.g., through the use of a data processing API or the like, may be implemented in a high level procedural or object oriented programming language to communicate with a computer system. However, the program(s) can be implemented in assembly or machine language, if desired. In any case, the language may be a compiled or interpreted language, and combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system comprising:
a compiler executing on a processor of a computing device comprising a memory connected to the processor, the compiler configured to:
receive identification of a particular programming language construct of a program, the particular programming language construct to be instrumented, wherein the particular programming language construct of the program comprises at least one of a statement, an invocation, a basic block, an expression, a class constructor, or an operator;
receive a representation of the program for compilation;
receive instrumentation for the particular programming language construct for a particular compilation of the program, the instrumentation being provided by a dynamic analyzer and not previously defined in the compiler; and
insert the instrumentation for the particular programming language construct into the representation of the program during compilation without reprogramming the compiler,
wherein the representation is an intermediate representation of the program and the instrumentation comprises a call to the dynamic analyzer that is inserted, by the compiler, into the intermediate representation of the program.

2. The system of claim 1, wherein the dynamic analyzer is one of an extensible set of dynamic analyzers.

3. The system of claim 1, wherein the dynamic analyzer is provided to an instrumenting programming module of the compiler at compilation of the program.

4. The system of claim 1, wherein the dynamic analyzer provides the instrumentation with one or more intermediate representation nodes to insert into the representation of the program.

5. The system of claim 1, wherein the dynamic analyzer inherits a base type that encodes a specification of points in the program for the instrumentation to collect runtime information.

6. The system of claim 5, wherein, at runtime, the dynamic analyzer accesses a table for storing dynamic analysis information for the particular programming language construct.

7. A method comprising:
providing, to a processor:
an identification of a particular programming language construct of a program to be compiled and instrumented by a compiler, the particular programming language construct to be instrumented, wherein the particular programming language construct of the program comprises at least one of a statement, an invocation, a basic block, an expression, a class constructor, or an operator,
the program to be compiled and instrumented;
a dynamic analyzer, the dynamic analyzer implementing an application programming interface; and
a location of the particular programming language construct in the program; and
using the application programming interface implemented by the dynamic analyzer, inserting instrumentation for the particular programming language construct into a representation of the program during a front end phase of compilation without reprogramming the compiler.

8. The method of claim 7, wherein the dynamic analyzer provides code that collects code coverage information when the program is executed.

9. The method of claim 8, wherein the dynamic analyzer identifies an instrumentation method that collects the code coverage information, and inserting the instrumentation includes inserting a call to the instrumentation method into the representation of the program.

10. The method of claim 9, wherein the instrumentation method accesses a table for storing dynamic analysis information.

11. The method of claim 7, wherein dynamic analysis information is collected when the program is run.

12. The method of claim 7, further comprising:
providing multiple dynamic analyzers to the processor, thereby extending a set of instrumentations to be performed without reprogramming the compiler.

13. A device comprising:
a memory; and
a processor connected to the memory, the processor configured to:
receive, by a compiler, identification of a particular programming language construct of a program, the particular programming language construct to be instrumented, wherein the particular programming language construct of the program comprises at least one of a statement, an invocation, a basic block, an expression, a class constructor, or an operator;
receive, by the compiler, extensible instrumentation for the particular programming language construct of the program for a particular compilation of the program, the extensible instrumentation not previously defined in the compiler; and
insert the extensible instrumentation for the particular programming language construct into a representation of the program during compilation without reprogramming the compiler, the extensible instrumentation collecting dynamic analysis information upon execution of a compiled binary generated from the program,
wherein the extensible instrumentation comprises a call to a dynamic analyzer.

14. The device of claim 13, wherein the dynamic analyzer comprises an instance of a class having a public method that registers statement actions when the program executes.

15. The device of claim 14, wherein the representation is an intermediate representation, and the processor is further configured to:
inject the call to the dynamic analyzer into the intermediate representation of the program generated by the compiler.

16. The device of claim 14, wherein the representation is an intermediate representation, and the processor is further configured to:
by the compiler, insert, into the intermediate representation of the program, intermediate representation nodes representing loop iteration counts for while loops of the program,
the call to the dynamic analyzer causing the dynamic analyzer to count how many iterations that the while loops execute at runtime using the intermediate representation nodes.

17. The device of claim 14, wherein the representation is an intermediate representation, and the processor is further configured to:
by the compiler, insert, into the intermediate representation of the program, intermediate representation nodes representing method call counts for executions of methods of the program,
the call to the dynamic analyzer causing the dynamic analyzer to count how many times that the methods execute at runtime using the intermediate representation nodes.

18. The device of claim 13, wherein the processor is further configured to:
inject the call to the dynamic analyzer into rewritten code generated by the compiler.

19. The device of claim 13, wherein the representation is an intermediate language representation of the program, and the processor is configured to:
insert first extensible instrumentation for a particular statement in the program into the intermediate language representation of the program;
insert second extensible instrumentation for a particular invocation in the program into the intermediate language representation of the program;
insert third extensible instrumentation for a particular basic block in the program into the intermediate language representation of the program;
insert fourth extensible instrumentation for a particular expression in the program into the intermediate language representation of the program;
insert fifth extensible instrumentation for a particular method in the program into the intermediate language representation of the program;
insert sixth extensible instrumentation for a particular subroutine in the program into the intermediate language representation of the program;
insert seventh extensible instrumentation for a particular global function in the program into the intermediate language representation of the program;
insert eighth extensible instrumentation for a particular class constructor in the program into the intermediate language representation of the program; and
insert ninth extensible instrumentation for a particular operator in the program into the intermediate language representation of the program.

20. The device of claim 13, wherein the dynamic analysis information comprises at least the following:
identification of specific statements in the program that execute at runtime,
a number of times each specific statement in the program executes at runtime,
a number of times each specific method in the program executes at runtime,
respective sets of actual receiver types for each virtual method call in the program as determined at runtime,
sizes of arrays allocated at runtime for each array creation expression in the program,
maximum call stack depths at runtime for each method call site in the program,
actual types determined at runtime for each cast in the program, and
patterns in execution path traces at runtime between at least one if statement in the program and at least one other if statement in the program.

* * * * *